Nov. 1, 1932.  L. A. BIXBY  1,886,154
SPEED TRANSMISSION
Filed Aug. 8, 1930   5 Sheets-Sheet 1

Inventor
Leo A. Bixby
By Vannig Vannig
Attorneys

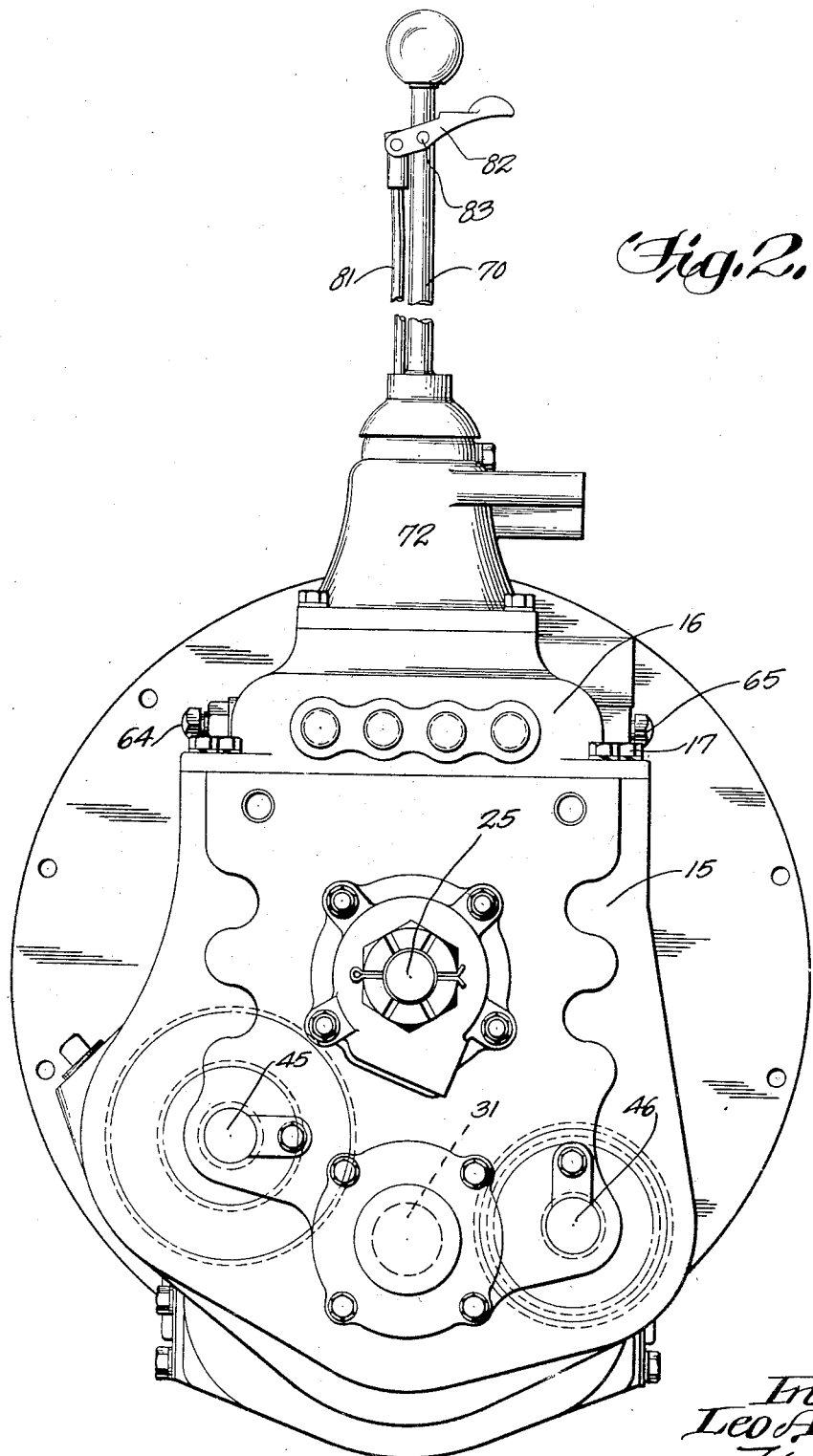

Nov. 1, 1932.  L. A. BIXBY  1,886,154
SPEED TRANSMISSION
Filed Aug. 8, 1930    5 Sheets-Sheet 3
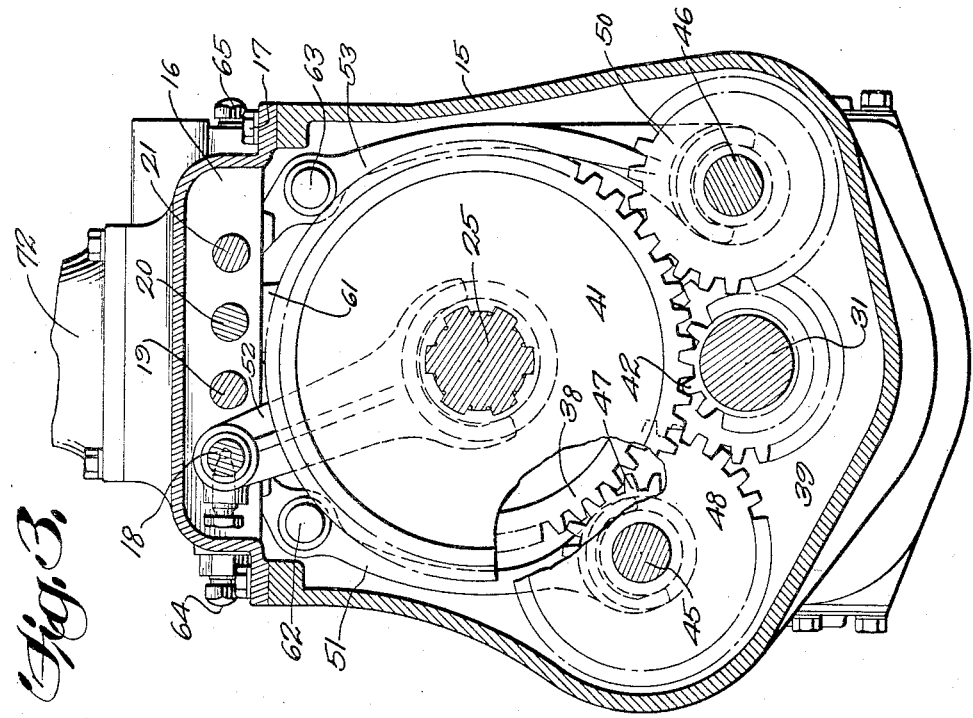
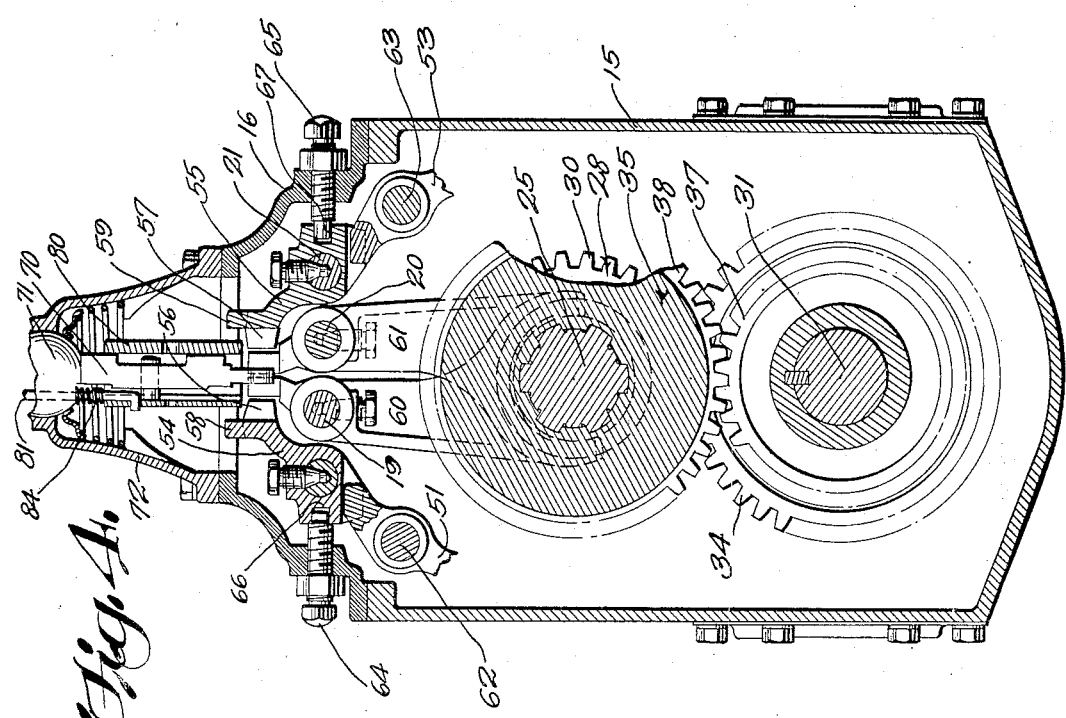
Inventor
Leo A. Bixby
By [signature]
Attorneys Nov. 1, 1932.  L. A. BIXBY  1,886,154
SPEED TRANSMISSION
Filed Aug. 8, 1930   5 Sheets-Sheet 4

FRONT

REAR

Inventor
Leo A. Bixby
By [signature]
Attorneys

Nov. 1, 1932. L. A. BIXBY 1,886,154
SPEED TRANSMISSION
Filed Aug. 8, 1930  5 Sheets-Sheet 5
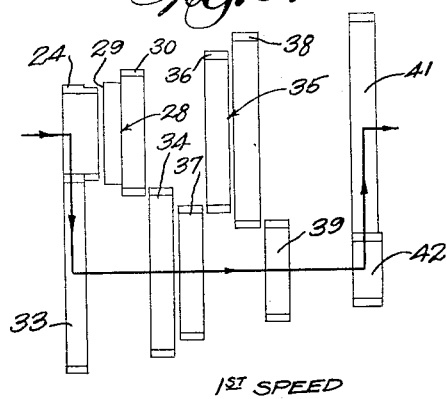
Fig. 8. 1ST SPEED
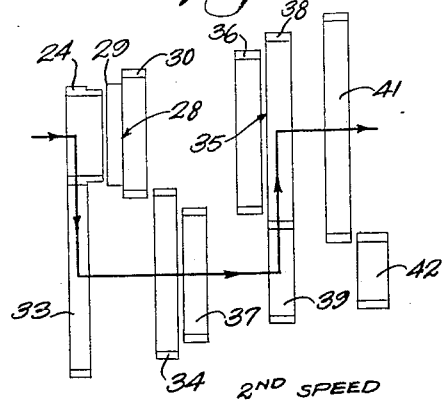
Fig. 9. 2ND SPEED
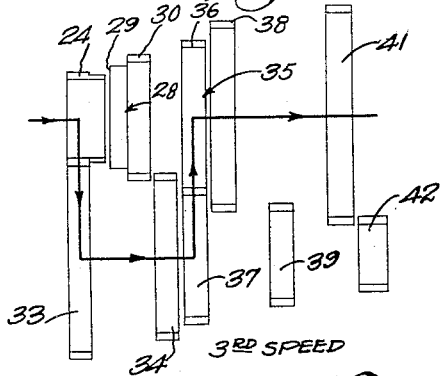
Fig. 10. 3RD SPEED
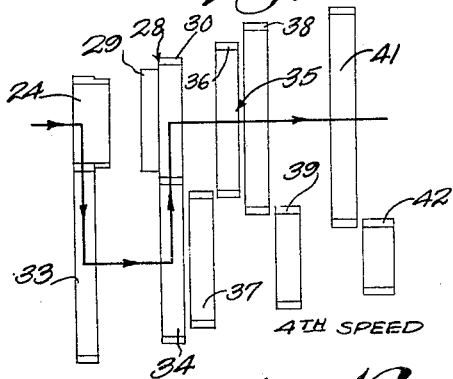
Fig. 11. 4TH SPEED
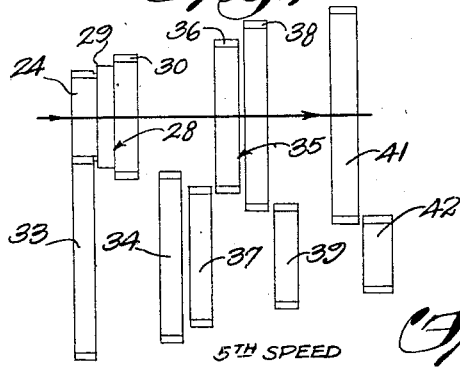
Fig. 12. 5TH SPEED
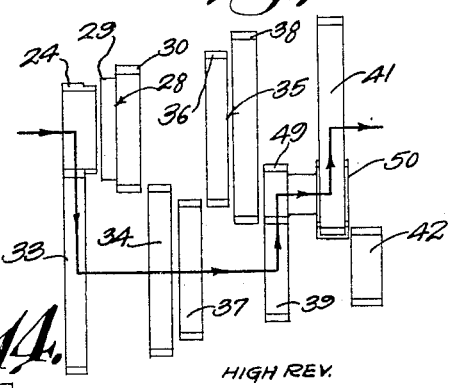
Fig. 13. HIGH REV.
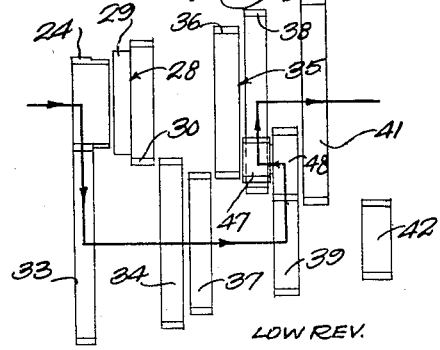
Fig. 14. LOW REV.
Inventor
Leo A. Bixby
By
Attorneys Patented Nov. 1, 1932

1,886,154

UNITED STATES PATENT OFFICE

LEO A. BIXBY, OF MILWAUKEE, WISCONSIN, ASSIGNOR TO UNIT CORPORATION OF AMERICA, OF MILWAUKEE, WISCONSIN

SPEED TRANSMISSION

Application filed August 8, 1930. Serial No. 473,819.

This invention appertains to speed transmissions and more particularly to transmissions of the type generally employed in motor vehicles.

One of the primary objects of my invention is to provide an improved variable speed transmission gearing for motor vehicles having five forward speeds and two reverse speeds with novel means for operating the change speed gear mechanism whereby the shift gears can be actuated from a single gear shift lever.

Another salient object of my invention is to provide a selective variable speed gear transmission for motor vehicles embodying five forward speeds and two reverse speeds with novel means for arranging the shift rods and yokes relative to a novel arrangement of gears on the mainshaft, countershaft and idler shafts, whereby the entire transmission including its housing will occupy a minimum amount of space and whereby the gears can be conveniently selected and operated through the medium of a single shift lever, without any inconvenience on the part of the operator over the usual type of change speed transmission and with the added benefit of an extreme low forward gear and the ease of stepping up the speed of the vehicle from a low gear to a high gear without undue strain on the engine and the benefit of a high reverse gear for backing a vehicle over a relatively long distance.

A further important object of my invention is the provision of novel means for shifting the low or first speed shift gear and a reverse gear with the same shift rod, the relative position of the reverse gear and the forward low speed sliding gearing being such that when the forward low speed gear is shifted into its engaged position, the reverse gear, which must move equally in direction and in amount with the forward speed gear, does not interfere with the adjacent parts of the transmission, and, similarly, when the reverse gear is shifted into its engaged position, the forward low speed sliding gear, in its consequent motion, clears its adjacent parts, whereby the necessity of providing separate shift rods for the two gears is eliminated.

A further object of my invention is the provision of means carried directly by the single gear shift lever for preventing the accidental shifting into either one of the reverse speed positions, said means being controlled by a hand grip latch mounted on said shift lever.

A still further object of my invention is to provide an improved selective variable speed gear transmission for motor vehicles of the above character, which will be durable and efficient in use, one that will be simple and easy to manufacture, and one which can be placed upon the market and incorporated with the conventional parts of a standard motor vehicle at a low cost.

With these and other objects in view, the invention consists in the novel construction, arrangement and formation of parts, as will be hereinafter more specifically described, claimed, and illustrated in the accompanying drawings, in which drawings:—

Figure 2 is a rear end elevation of my improved transmission.

Figure 3 is a transverse section through the same taken on the line 3—3 of Figure 1 looking in the direction of the arrows.

Figure 4 is a transverse section through the improved transmission taken on the line 4—4 of Figure 1 looking in the direction of the arrows.

Figure 1:
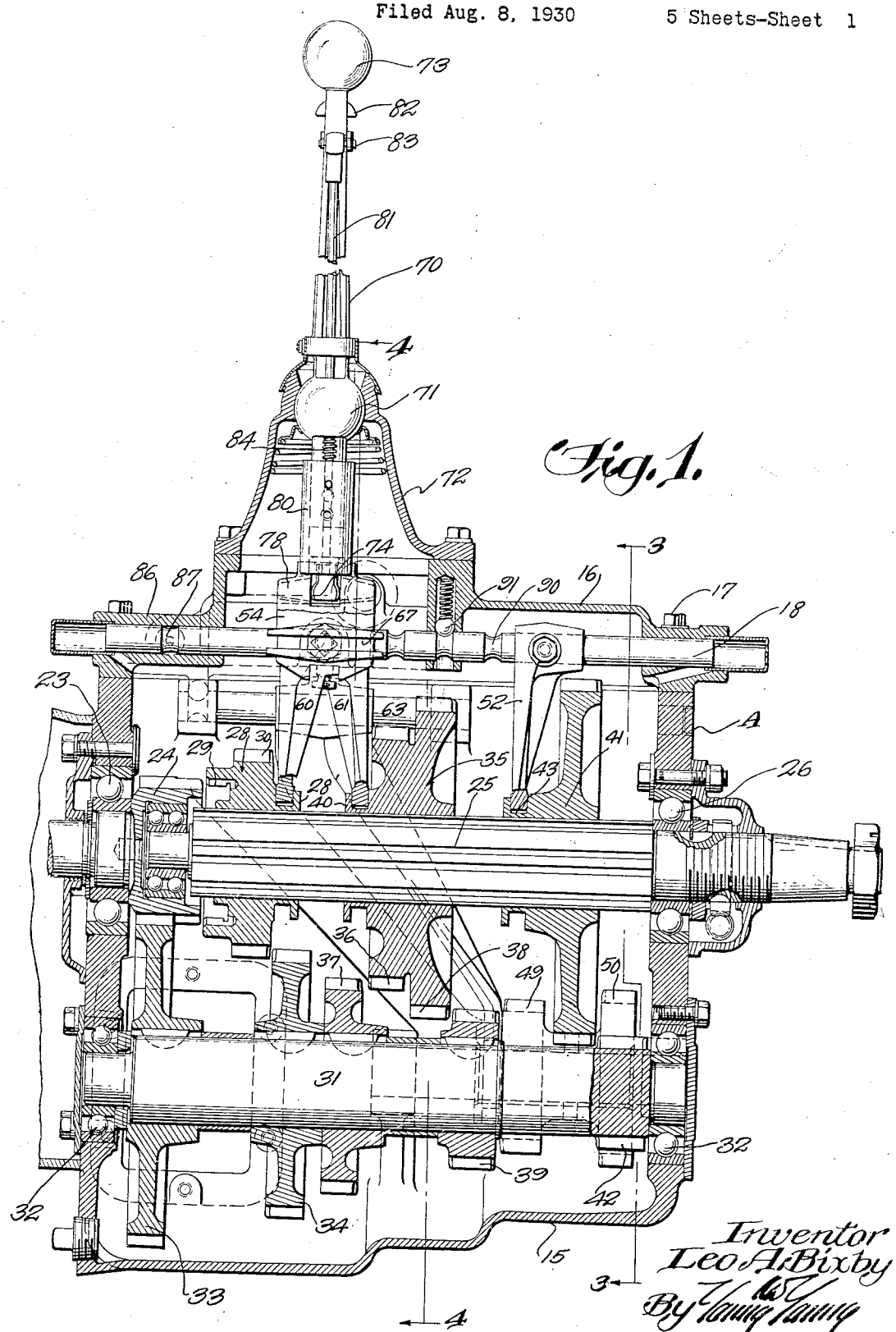
Figure 1 is a longitudinal section through my improved transmission.
Figure 5:
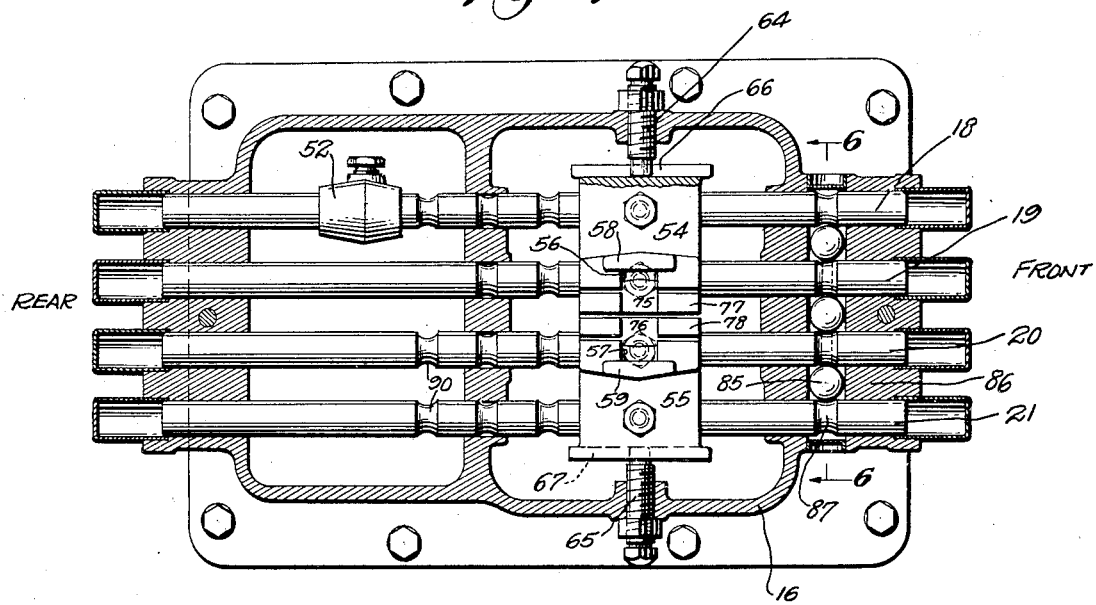
Figure 5 is a horizontal section illustrating the arrangement of the shift rods and their shift locks.
Figure 6:
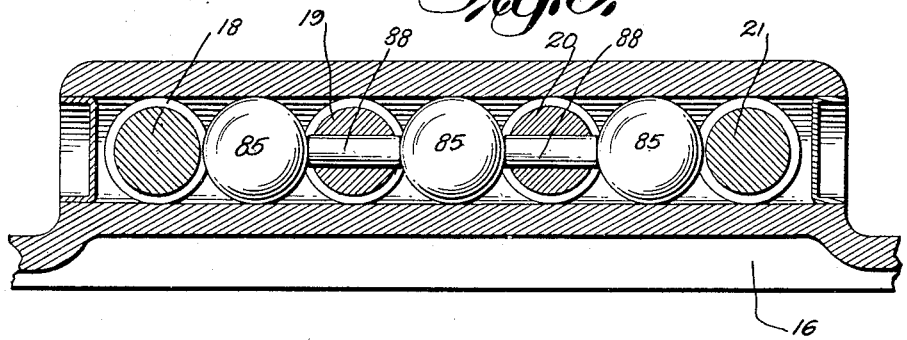
Figure 6 is an enlarged detail transverse section taken on the line 6—6 of Figure 5 looking in the direction of the arrows illustrating the interlocks for preventing accidental movement of the shift rods.
Figure 7:
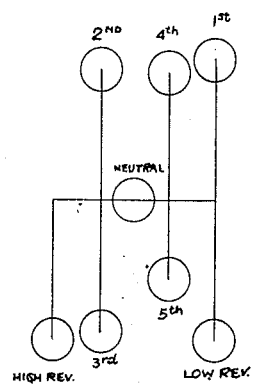
Figure 7 is a diagrammatic view illustrating the speed positions for the shift lever.

Figures 8 to 14 inclusive are diagrammatic views illustrating the different positions of the various gears for obtaining the desired forward and reverse speed positions.

Referring to the drawings in detail, wherein similar reference characters designate corresponding parts throughout the several views, the letter A generally indicates my improved transmission which comprises a casing 15 carrying a cover 16 secured thereto by the use of suitable cap screws 17 or the like, which cover supports the sliding shift rods 18, 19, 20 and 21, which will be hereinafter more fully referred to.

Extending into the front wall of the transmission casing 15 is the driving shaft and gear 24 journalled in suitable bearings 23 carried by the said transmission housing or casing 15. The drive shaft 24 leads from the usual clutch mechanism. Within the end of the drive gear 24 is piloted the reduced end of a spline or main shaft 25 extending through the housing and having a bearing 26 at the rear wall thereof. The rear end of this shaft which protrudes beyond the transmission housing or casing 15 is connected in the usual way with the motor vehicle propeller shaft and the shaft 25 can have means for permitting the connection of the usual speedometer drive shaft therewith.

Splined on the shaft 25 is a gear 28 having internal gear teeth 29 which may be moved on its shaft to engage said teeth 29 with the teeth of the main drive gear 24. Likewise the gear 28 is provided with external spur teeth 30 and a collar 28' for connection with a yoke, as will be later brought out.

A countershaft 31 is journalled in the transmission housing or casing 15, the front and rear walls of the same being provided with suitable bearings 32 for said shaft and the countershaft has keyed or otherwise secured thereto at its forward end the gear 33 which is constantly in mesh with the teeth of gear 24. A fourth speed gear 34 is likewise secured to the countershaft 31 which may mesh with and drive gear 28, when the teeth 29 of said gear 28 are moved from out of engagement with the teeth of the gear 24 and the teeth 30 into engagement with gear 34. Splined on the main shaft 25 is a double gear 35 capable of being shifted both forward and backward, the front gear 36 thereof being shiftable on its forward movement in meshing engagement with a speed gear 37 secured to the countershaft 31. The rear gear 38 of the double gear 35 is shiftable in its rearward movement into engagement with the speed gear 39 secured to the countershaft 31, the gears 36 and 38 of the double gear 35 being of different diameters, as can be readily seen. This double gear 35 likewise carries a yoke collar 40. Likewise splined on the mainshaft 25 is a single shaft gear 41 of greater diameter than the other gears heretofore mentioned and this gear is shiftable in its rearward movement into engagement with the countershaft speed gear 42, the speed gear 42 being keyed or otherwise secured to the countershaft.

Particular attention is invited to the position of the extreme low or first speed gear 42 relative to the second speed gear 39 and the mainshaft low speed gear 41, as by the arrangement of this gear 41 and the mainshaft second and third speed gears 35, in conjunction with the rest of a conventional transmission, I am enabled effectively to obtain the five forward speeds as well as the two reverse speeds, as will be later explained.

Supported in the transmission housing or casing 15, on each side of the countershaft 31, are idler gear shafts 45 and 46 which have rotatably and slidably mounted thereon, respectively, the gears 47 and 48 and the gears 49 and 50. Gears 47 and 48 must either be integral or fastened together for the purpose of obtaining unitary movement both in a forward and rearward direction and also while rotating. The same yoke collar is used to actuate them both. The same condition holds true for gears 49 and 50.

Referring to the position of the gears to bring about the various forward speeds, when it is desired to go into the first speed, the single gear 41 is shifted rearwardly into meshing engagement with the gear 42 and (see Figure 8) the drive will be through the main drive gear 24, the countershaft drive gear 33, the countershaft 31, the meshing gears 42 and 41, and through the mainshaft to the propeller shaft.

When it is desired to go into second speed the gear 35 is shifted rearwardly so as to mesh the teeth 38 thereof with the second speed gear 39 on the countershaft and the drive will be through (see Figure 9) the meshing gears 24 and 33, the countershaft 31, and the meshing gears 39 and 38, through the main or spline shaft 25. When it is desired to drive from the third speed, the gear 35 is shifted forwardly so that the teeth 36 will mesh with the teeth of gear 37 and the drive will be through (see Figure 10) meshing gears 24 and 33, the countershaft 31, meshing gears 37 and 36 through the spline or mainshaft 25. When it is desired to drive in the fourth speed the gear 28 is shifted rearwardly so as to mesh its teeth 30 with the gear 34 on the countershaft and the drive will be through (see Figure 11) the meshing gears 24 and 33, countershaft 31, through gears 34 and 30 and through the spline or mainshaft 25. When it is desired to drive in the fifth speed the gear 28 is shifted forwardly so that its internal teeth 29 will mesh directly with the teeth of the gear 24 and consequently the drive will be transmitted directly from the main drive gear 24 to the spline or mainshaft 25 (see Figure 12).

When it is desired to shift into low reverse, the gears 47 and 48 are shifted forwardly so as to mesh respectively with the gear 38 and with the gear 39, and, consequently (see Figure 14) the drive will be through the gears 24 and 33, countershaft 31, gears 39 and 48 and gears 47 and 38 through the main or spline shaft 25.

When it is desired to drive in high reverse, the idler gears 49 and 50 are shifted forwardly into meshing engagement respectively with the gear 39 on the countershaft and with the mainshaft gear 41 and consequently the drive will be through (see Figure 13) meshing gears 24 and 33, through countershaft 31, through meshing gears 39 and 49, and through meshing gears 50 and 41 through the main or spline shaft 25.

It is understood that it is possible by changing the number of teeth in the gear sets to alter the sequence of speeds.

Particular attention is now invited to the means for operating the mentioned gears and it is to be noted that the shift rods 18, 19, 20 and 21 are mounted within suitable guides in the transmission casing cover 16 in spaced parallel relation to one another. The shift rod 18 is provided for operating both the single gear 41 for bringing about the low speed or first forward speed and for bringing about the low reverse speed and thus this shift rod has connected thereto front and rear yokes 51 and 52 which engage respectively the shift collar of the gears 47 and 48 and the shift collar 43 of the single gear 41. The yokes 51 and 52 can be connected to their shift rod 18 in any preferred way. The shift rod 21 is provided for shifting the unitary gears 49 and 50 and consequently this shift rod has secured thereto in any desired way the yoke 53 which is connected with the shift collar of these gears. Likewise the rods 18 and 21 have keyed or otherwise secured thereto in any preferred way the inwardly directed shift blocks 54 and 55 which extend over and above the intermediate shift rods 19 and 20. The shift block 54 is provided with the shift rod lever notch 56 on its inner face and likewise the shift block 55 is provided with a notch 57 on its inner face for the lower end of the shift lever and each of these shift blocks 54 and 55 above the notches 56 and 57 are provided respectively with limiting lugs 58 and 59 for preventing the entrance of the lower end of the shift lever in the notches for shifting said rods 18 and 21 except under certain conditions as will be later described. The shift rod 19 has keyed or otherwise secured thereto the depending yoke 60 which engages the collar 28' of the shift gear 28 and thus this shift rod is employed for bringing about the shifting into fourth and fifth speeds. The shift rod 20 has keyed or otherwise secured thereto the depending yoke 61 which receives the collar 40 of the gear 35 and consequently the shift rod 20 controls the shifting of the gears into second and third speeds.

If preferred, additional side guide rods 62 and 63 can be employed respectively for the side yokes 51 and 53 as shown, these yokes 51 and 53 being provided with suitable guide sleeves for receiving the said guide rods 62 and 63.

In order to further guide the side guide blocks 54 and 55 in their movement and to take up any slack therein, the opposite sides of the gear casing cover 16 can receive adjustable screws 64 and 65, the inner ends of which are smooth for bearing engagement with slots 66 and 67 formed in the outer faces of said guide blocks 54 and 55.

Owing to the arrangement of the shift rods, yokes and gears, I am enabled to bring about the desired shifting of the gears by the use of a single conventional shift lever 70, which is mounted in the usual manner for universal movement, as at 71 in the dome 72 of the gear case cover 16. The upper end of the lever 70 is provided with the usual manipulating knob 73, while the lower end of the same is provided with the shift head 74, for engagement in the shift notches 56 and 57 of the shift blocks 54 and 55 and the shift notches 75 and 76 of the intermediate shift blocks 77 and 78 which are secured to the intermediate shift rods 19 and 20.

Consequently, when the shift head 74 of the shift lever is moved into the shift notch 75 of the block 77 upon forward or rearward movement of the lever, the shift block 77 and its rod 19 will be slid either forward or rearward. Likewise when the shift head 74 is slid into the shift notch 76 of the shift block 78 and the lever swung forward or rearward, the shift block and its shift rod 20 will consequently be moved either forward or rearward. Also when the shift head 74 of the shift lever is swung to the extreme lateral position to the left, Figure 4, the knob will engage in the groove 56 of the shift block 54, consequently permitting the shift rod 18 to be moved forward or rearward according to the direction of movement of the lever.

Also when the shift head 74 is moved to extreme right (see Figure 4) into engagement with the wall of the shift notch 57, the shift block 55 can be shifted forward or rearward as the case may be, according to the direction of movement of the shift lever.

In order to prevent the accidental shifting, by the operator either into the extreme low or first speed or into either low or high reverse, means is provided for normally preventing the movement of the shift head 74 of the shift lever into the shift notches 56 and 57 of the shift blocks 54 and 55. This means comprises a sliding sleeve or latch 80 carried directly by the shift lever above the shift head 74 and this sleeve or latch is normally disposed so that the lugs 58 and 59 of the shift blocks 54 and 55 will be in the path of the same. Consequently it is necessary to raise this sleeve or latch 80 above said lugs 58 and 59. The means for raising the sleeve or latch 80 consists of a slide link 81, the lower end of which is connected to the sleeve or latch 80 and the upper end of which is pivotally connected to a hand grip 82 pivotally carried, as at 83 by the shift lever 70 adjacent to its upper end. It is obvious that by pressing down on the free end of the grip 82 the link 81 will be raised, consequently raising the sleeve 80 therewith. Spring means 84 is normally provided for holding the sleeve in its downward position.

To prevent accidental movement of any of the shift rods 18, 19, 20 or 21 by jarring or movement of one shift rod when another is actuated, I have provided an interlocking construction which consists of balls 85 arranged in the partitions 86 between the guides for the shift rods and adapted at diametrically opposed points to seat in annular grooves 87 formed in the shift rods. The two intermediate shift rods 19 and 20 are provided with interlocking pins 88 which terminally protrude into the annular grooves 87 of said intermediate shift rods. When one of the slide or shift rods is moved longitudinally in its guide, it represses the adjacent ball 85, which is in engagement therewith forcing it laterally to engage the next shift rod, thereby locking all of the other shift rods against movement, the movement of the first ball being transmitted to the other balls through the medium of the interlocking pins 88. If, for example, the shift rod 21 is actuated, it displaces the interlocking ball adjacent thereto laterally to engage the intermediate shift rod 20, and at the same time moves the interlocking pin 88 88 to force the other ball 85 into locking engagement with the adjacent shift rod, which latter ball in turn operates the interlocking pin 88 carried by the shift or slide rod 19, and this motion is transmitted to the last locking ball 85 between the shift rods 18 and 19 by the interlocking pin carried by the shift or slide rod 19, thus locking the shift or slide rod 18.

In order to prevent accidental movement of a shift rod after actuation thereof into any one of their adjusted positions, the rods are provided with spaced annular locking grooves 90 into which are adapted to seat spring pressed locking balls 91 carried by the gear casing cover 16. These locking grooves 90 are so spaced as to be directly under a locking ball when moved to its engaged position.

As previously stated, one of the important objects of the invention is the provision of the arrangement of the single shift gear 41 relative to the low speed idler gear which is operated by the same shift rod and the high speed reverse idler gear which is operated by another shift rod. By referring to Figure 1 of the drawings and to the diagrammatic showing in Figures 13 and 14, it will be noted that the extreme low speed gear 42 and the second speed gear 39 are so spaced that the forward sliding movement of the single shift gear 41 will not interfere with the second speed gear 39 and that the reverse gears on their idler shafts are so arranged as not to interfere with the single gear 41 in its different positions.

From the foregoing description, it can be seen that I have provided a novel transmission embodying five speeds forward and two reverse which is of an exceptionally simple and compact nature and which will effectively accomplish the purpose intended.

Changes in details may be made without departing from the spirit or the scope of this invention.

What I claim as new is:

1. In a transmission including a drive gear, a countershaft, a countershaft drive gear rigidly mounted on said shaft meshing with the drive gear whereby the countershaft is driven by the drive gear, a mainshaft, and means for clutching the mainshaft to the drive gear; a set of speed gears of different diameters secured to the countershaft, a set of independently shiftable gears of different diameters splined on the mainshaft shiftable into and out of engagement with the gears on the countershaft, a set of idler gears fixed for unitary movement shiftable into engagement with one of the gears on the countershaft and one of the mainshaft gears, a single means for simultaneously shifting another of said mainshaft gears and the idler gears, a second set of idler gears fixed for unitary movement, and independent means for shifting the last mentioned set of idler gears into meshing engagement with the last mentioned mainshaft gear, when the same is out of engagement with its countershaft gear, and with one of the countershaft gears.

2. In a transmission including a drive gear, a countershaft, a countershaft drive gear rigidly mounted on said shaft meshing with the drive gear, whereby the countershaft is driven by the drive shaft, a mainshaft, and means for clutching the mainshaft to the drive shaft; a set of speed gears of different diameters secured to the countershaft, a set of independently shiftable gears of different diameters splined on the mainshaft shiftable into and out of engagement with the gears on the countershaft, a set of idler gears fixed for unitary movement shiftable into engagement with one of the gears on the countershaft and one of the mainshaft gears, a single means for simultaneously shifting another of said shift gears and the idler gears, a second set of idler gears fixed for unitary movement, independent means for shifting the last mentioned set of idler gears into meshing engagement with the last mentioned shift gear, when the same is out of engagement with its countershaft gear, and with one of the countershaft gears, the first mentioned set of idler gears and the second mentioned set of idler gears being arranged on opposite sides of the countershaft.

3. In a transmission including a drive shaft gear, a countershaft, a countershaft drive gear rigidly mounted on said shaft meshing with the drive shaft gear, whereby the countershaft is driven by the drive shaft gear, a mainshaft, a speed gear secured to the countershaft for rotation therewith, a shift gear splined on the mainshaft for movement into and out of meshing engagement with the speed gear, means on the shift gear for engaging the drive shaft gear, and means for shifting said shift gear; first, second, third and fourth speed gears of different diameters secured to the countershaft for rotation therewith in spaced relation, a double shift gear having toothed faces of different diameters splined on the mainshaft shiftable into and out of meshing engagement with the second and third speed gears, means for shifting said double shift gear, a single shift gear of greater diameter than the mentioned shift gears splined on the mainshaft, and movable into and out of meshing engagement with the first speed gear, a set of idler gears fixed for unitary movement arranged at one side of the countershaft movable into engagement with the second speed gear and one of the toothed faces of the double gear and out of meshing engagement therewith, a single means for operating the single shift gear, and the set of idler gears, a second set of idler gears fixed for unitary movement and arranged on the opposite side of the countershaft from the first set of idler gears, and independent means for shifting the second mentioned set of idler gears into and out of meshing engagement with the second speed gear on the countershaft and the single shift gear when the same is out of meshing engagement with the countershaft first speed gear.

4. In a transmission including a drive shaft gear, a countershaft, a countershaft drive gear rigidly mounted on said shaft meshing with the drive shaft gear, whereby the countershaft is driven by the drive shaft gear, a mainshaft, a speed gear secured to the countershaft for rotation therewith, a shift gear splined on the mainshaft for movement into and out of meshing engagement with the speed gear, means on the shift gear for engaging the drive shaft gear and means for shifting said shift gear; first, second, third and fourth speed gears of different diameters secured to the countershaft for rotation therewith in spaced relation, a double shift gear having toothed faces of different diameters splined on the mainshaft shiftable into and out of meshing engagement with the second and third speed gears, means for shifting said double shift gear, a single shift gear of greater diameter than the mentioned shift gears splined on the mainshaft, and movable into and out of meshing engagement with the first speed gear, a set of idler gears fixed for unitary movement arranged at one side of the countershaft movable into engagement with the countershaft second speed gear and one of the toothed faces of the double gear and out of meshing engagement therewith, a single means for operating the single shift gear and the set of idler gears, a second set of idler gears fixed for unitary movement and arranged on the opposite side of the countershaft from the first set of idler gears, independent means for shifting the second mentioned set of idler gears into and out of meshing engagement with the second speed gear on the countershaft and the single shift gear when the same is out of meshing engagement with the countershaft first speed gears, and releasable means for preventing accidental operation of the sets of idler gears.

5. In a transmission including a drive shaft gear, a countershaft, a countershaft drive gear rigidly mounted on said shaft meshing with the drive shaft gear, whereby the countershaft is driven by the drive shaft, a mainshaft, a speed gear on the countershaft, a shift gear splined on the mainshaft movable into and out of meshing engagement with the speed gear, a shift rod, and a yoke connecting the shift rod with the shift gear; first, second, third and fourth speed gears secured to the countershaft for rotation therewith, a double shift gear splined on the mainshaft having gear faces of different diameters shiftable into and out of meshing engagement with the second and third speed gears, a shift rod, a yoke connecting the last mentioned shift rod with the double gear, a single shift gear slidable on the mainshaft of greater diameter than the other shift gears and shiftable into and out of meshing engagement with the first speed gear, a set of idler gears fixed for unitary movement shiftable into and out of meshing engagement with the second speed gear and one gear face of the double shift gear, a shift rod, a set of shift yokes secured at spaced points to the last mentioned shift rod and operatively connected respectively to the single shift gear and the set of idler gears, the set of idler gears being arranged on one side of the countershaft, a second set of idler gears shiftable into and out of meshing engagement with the second speed gear and the single shift gear when the same is out of meshing engagement with the countershaft first speed gear, a shift rod, a yoke connecting the last mentioned shift rod with the last mentioned set of idler gears, said last mentioned set of idler gears being arranged on the opposite side of the countershaft from the first set of idler gears, said two last mentioned shift rods being arranged on opposite sides of the first two mentioned shift rods, and a single lever mounted for universal movement having a shift head for selective shifting engagement with any one of the shift rods.

In testimony that I claim the foregoing I have hereunto set my hand at Milwaukee, in the county of Milwaukee and State of Wisconsin.

LEO A. BIXBY.